US011345070B2

(12) United States Patent
Navarra Pruna

(10) Patent No.: US 11,345,070 B2
(45) Date of Patent: May 31, 2022

(54) DEVICE FOR DEMOULDING NEGATIVES IN THERMOPLASTIC INJECTION MOULDS

(71) Applicant: COMERCIAL DE UTILES Y MOLDES, S.A., Barcelona (ES)

(72) Inventor: Alberto Navarra Pruna, Barcelona (ES)

(73) Assignee: COMERCIAL DE UTILES Y MOLDES, S.A., Barcelona (ES)

( * ) Notice: Subject to any disclaimer, the term of this patent is extended or adjusted under 35 U.S.C. 154(b) by 35 days.

(21) Appl. No.: 16/818,703

(22) Filed: Mar. 13, 2020

(65) Prior Publication Data
US 2020/0290255 A1 Sep. 17, 2020

(30) Foreign Application Priority Data
Mar. 13, 2019 (EP) ...................................... 19382182

(51) Int. Cl.
B29C 45/40 (2006.01)
B29C 45/72 (2006.01)
B29K 101/12 (2006.01)

(52) U.S. Cl.
CPC .......... B29C 45/4005 (2013.01); B29C 45/72 (2013.01); *B29K 2101/12* (2013.01)

(58) Field of Classification Search
CPC ..... B29C 45/44; B29C 45/72; B29C 45/4435; B29C 45/7312; B29C 45/4005; B29C 2045/4026; B29C 45/40
See application file for complete search history.

(56) References Cited

U.S. PATENT DOCUMENTS 3,642,417 A * 2/1972 Von Holdt .......... B29C 45/4435
425/443
5,137,442 A * 8/1992 Starkey ................. B29C 33/442
249/66.1
(Continued)

FOREIGN PATENT DOCUMENTS

DE 29907766 U1 9/1999
EP 2286974 A1 2/2011
(Continued)

OTHER PUBLICATIONS

Cumsa.com: "KR-Colled Lifter Rack Installation Demo", Youtube, Jan. 29, 2019, p. 1 pp., XP054979694, Retrieved from the Internet: URL: https://www.youtube.com/watch?time_continue=106 &vNc2PXC0IyDs [retrieved on Sep. 16, 2019].
(Continued)

*Primary Examiner* — Niki Bakhtiari
*Assistant Examiner* — Emmanuel S Luk
(74) *Attorney, Agent, or Firm* — Millman IP Inc.

(57) ABSTRACT

The device for demoulding negatives in thermoplastic injection moulds comprises an ejector (1) provided on one of the ends thereof with a figure insert (2) with a profile complementary to the part that is to be moulded, wherein said ejector (1) comprises an outer tube (11) housing an inner cooling tube (12), which cools said figure insert (2).

It allows for a device to be provided for demoulding negatives in thermoplastic injection moulds which enables the part to be obtained to be cooled, the cooling circuit reaching the figure area of the mould.

11 Claims, 1 Drawing Sheet

(56) References Cited

U.S. PATENT DOCUMENTS

| | | | | |
|---|---|---|---|---|
| 5,971,742 | A * | 10/1999 | McCollum | B29C 33/405 |
| | | | | 425/542 |
| 6,030,202 | A * | 2/2000 | Gellert | B29C 45/27 |
| | | | | 425/549 |
| 6,276,922 | B1 * | 8/2001 | Huston | B29C 45/7312 |
| | | | | 425/526 |
| 6,287,106 | B1 * | 9/2001 | Learn | B29C 45/44 |
| | | | | 264/328.7 |
| 6,749,420 | B2 * | 6/2004 | Navarra Pruna | B29C 45/401 |
| | | | | 425/556 |
| 10,682,794 | B2 * | 6/2020 | Navarra Pruna | B29C 45/4005 |
| 2002/0048618 | A1 * | 4/2002 | Pruna | B29C 45/401 |
| | | | | 425/556 |
| 2002/0187217 | A1 * | 12/2002 | McDonald | B29C 45/7312 |
| | | | | 425/547 |
| 2011/0003027 | A1 * | 1/2011 | Navarra Pruna | B29C 45/4435 |
| | | | | 425/556 |
| 2012/0183641 | A1 * | 7/2012 | Shih | B29C 45/401 |
| | | | | 425/577 |
| 2014/0147546 | A1 * | 5/2014 | Navarra Pruna | B29C 45/4435 |
| | | | | 425/552 |
| 2014/0377398 | A1 * | 12/2014 | Navarra Pruna | B29C 45/4435 |
| | | | | 425/444 |
| 2017/0246771 | A1 * | 8/2017 | Belliard | B29C 45/4005 |
| 2017/0355118 | A1 | 12/2017 | Starkey et al. | |
| 2018/0194051 | A1 * | 7/2018 | Suzuki | B29C 45/03 |
| 2018/0257280 | A1 * | 9/2018 | Navarra Pruna | B29C 45/4005 |

FOREIGN PATENT DOCUMENTS

| | | |
|---|---|---|
| EP | 2735423 A1 | 5/2014 |
| EP | 3372377 A1 | 9/2018 |
| FR | 2649640 A1 | 1/1991 |
| FR | 3073442 A1 | 5/2019 |
| JP | H04 251724 A | 9/1992 |

OTHER PUBLICATIONS

European Search Report for EP 19 38 2182 completed Sep. 18, 2019.

* cited by examiner

DEVICE FOR DEMOULDING NEGATIVES IN THERMOPLASTIC INJECTION MOULDS

CROSS REFERENCE TO RELATED APPLICATION

This non-provisional patent application claims priority under 35 U.S.C. § 119(a) from European Patent Application No. 19382182.4 filed on Mar. 13, 2019.

DESCRIPTION

The present invention relates to a device for demoulding negatives in thermoplastic injection moulds.

BACKGROUND OF THE INVENTION

All moulds for thermoplastic injection comprise at least two steel plates with dimensions suitable for the size of the product to be moulded, which, by means of guide columns between them, enable them to be separated in a guided manner so that each time they are separated or put together, they completely coincide.

These plates are designed such that they are each able to be separately coupled to each side of the two plates of the very injecting machine, such that in each injection cycle they are separated or put together according to the operability of the process, closing for injecting, or separating for demoulding the injected product. In the sector, these plates are called cavity plates and punch plates.

The cavity plate is the plate wherein the mechanising corresponding to the visible face of the injected product must be reproduced, while the punch plate is where the inner face of the product must be mechanised.

Normally, the punch plate is the face which requires less finishing details, since this is the portion of the product that is not visible and, therefore, is where the jobs to be performed require less finishing details.

This portion of the mould is where all the ejectors for demoulding the product are housed, as well as the mechanisms that each product may need for the demoulding thereof, while the cavity plate is that which requires better finishing details and eliminating as much as possible any insert that may have, with the final product, marks or irregularities on the aesthetic surface which could negatively affect the visual portion of the product in question.

Each of these plates must be mechanised according to the specifications of the product, it being essential to mechanise therein duly calculated cooling systems, such that when the part is injected with hot-melt material at a high temperature, the melted part can cool and solidify as fast as possible, and enable the demoulding of the completely hardened product.

The cooling process is vitally important for all the injection moulds, since a part that has just been injected must be in the mould long enough to prevent possible subsequent deformations.

However, not everything is a question of the speed of the process, since for a part to meet the specified requirements, certain demands must be fulfilled, wherein three fundamental aspects stand out, with a different order of priorities according to the final destination of the product: quality, visual appearance and mechanical resistance.

When the part of be injected has in the structure thereof areas that are difficult to demould, the use of mechanisms is required which, duly adapted to each case, should preserve the same cooling characteristics as the rest of the mould, since otherwise these areas, by not being cooled sufficiently, can have serious problems of visual quality which can only be corrected by delaying the moment of the ejection, for example, in parts for the sectors of automobiles, electrical appliances, cosmetics, electronics, telephones, etc.

Regardless of how the material enters the mould in a semi-liquid state, due to the temperature at which it has been melted, it will be injected using pressure until all the cavity is full, during a period of time the machine is maintaining the closing pressure, while the cooling circuits are providing cold to the mould and solidifying the product. This is the most critical moment of the process, since if the part is not sufficiently hardened, the areas that are still in a paste-like state will start to harden outside the cavity, and these areas will show sink marks which clearly indicate that the part has not been perfectly injected.

Currently, if the necessary mechanisms have certain dimensions, creating an independent cooling circuit does not have large drawbacks, but when these mechanisms have small dimensions, it is practically impossible to achieve.

In these cases, the only remaining alternative is that of extending the injection cycle, so that the part is completely solidified before being demoulded and it can have the desired appearance.

This problem shows up frequently, since each time greater production, lower manufacturing costs and higher excellence of quality are expected in order to compete in the industrial world.

Therefore, if we are able to cool these small inserts, we could achieve a considerable increase in the production, as well as a considerable decrease in the production costs.

Patent application EP 3 372 377 A1 of the same holder describes a device for demoulding negatives in thermoplastic injection moulds which enables achieving the demoulding of negative areas with difficult solutions, but does not comprise any means for cooling the product to be manufactured.

Therefore, an objective of the present invention is providing a device for demoulding negatives in thermoplastic injection moulds which enables the part to be obtained to be cooled, the cooling circuit reaching the figure area of the mould.

DESCRIPTION OF THE INVENTION

The mentioned drawbacks are resolved with the device of the invention, while presenting other advantages which will be described below.

The device for demoulding negatives in thermoplastic injection moulds according to the present invention has an ejector provided in one of the ends thereof, a figure insert with a profile complementary to the part that is to be moulded, wherein said ejector comprises an outer tube housing an inner cooling tube, which cools said figure insert.

Advantageously, said outer tube is made of a flexible material. For example, the outer tube is made of carbon fibre, carbon fibre mixed with fibreglass or graphene.

Furthermore, in the device according to the present invention, said figure insert is joined to the ejector by means of a joining head, and said joining head comprises at least one airtight O-ring.

According to a preferred embodiment, the inner cooling tube is made of stainless steel, although it could be made of any suitable material.

Advantageously, said ejector defines an upper segment and a lower segment, the longitudinal axis of the upper segment forming an acute angle with the longitudinal axis of the lower segment. For example, said acute angle formed by the longitudinal axis of the upper segment with the longitudinal shaft of the lower segment is less than or equal to 6°.

Furthermore, the device for demoulding negatives in thermoplastic injection moulds according to the present invention also comprises a guiding bushing inside of which said ejector moves, and the ejector is fastened to an ejector plate by means of a fastening base, a tightening cone and a tightening nut.

Advantageously, said ejector comprises on the far end thereof of the figure insert a cooling source provided with an inlet for cooling liquid and an outlet for cooling liquid, the inlet of the cooling liquid being produced through said inner tube and the outlet of the cooling liquid being produced through the space defined between the outer tube and the inner tube.

In the device according to the present invention, it is achieved that the cooling circuit is able to cool the figure area, making cooling liquid circulate through the inside of the flexible ejector.

With this solution, the connection of the cooling circuit is enabled from the fastening base thereof to the figure insert, but such that the mechanical resistance thereof enables them to support the pressures that the device needs to endure, as well as preventing corrosion and having enough mechanical resistance to be handled and adjusted with as much precision as possible and the other mechanical characteristics common in the operations thereof.

For this case, the behaviour of different materials was studied and the conclusion was reached that there are at least two materials that could have these characteristics: graphene and carbon fibre.

In particular, it has been demonstrated that the combination of carbon with fibreglass enables the required objectives to be achieved with all the provision of use thereof.

BRIEF DESCRIPTION OF THE DRAWINGS

To better understand what has been set forth, several drawings are attached in which a practical embodiment is schematically depicted merely by way of non-limiting example.

DESCRIPTION OF A PREFERRED EMBODIMENT

Figure 1:
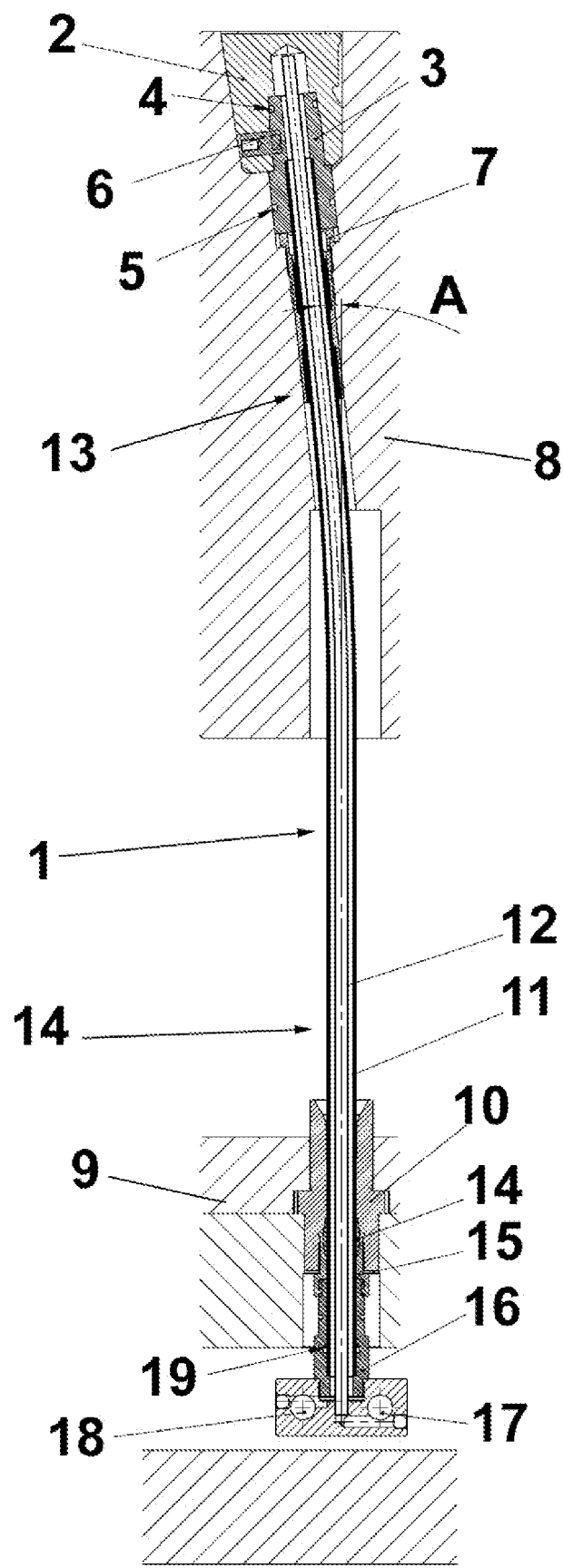
FIG. 1 is a cross-sectional elevation view of the device for demoulding negatives in thermoplastic injection moulds according to the present invention.

First of all, it must be indicated that the device according to the present invention is used to demould negatives that are usually considered small, meaning, with dimensions smaller than 3 mm, in the negative area thereof.

As shown in FIG. 1, the device for demoulding negatives in thermoplastic injection moulds comprises an ejector 1 provided on one of the ends thereof with a figure insert 2 with a profile complementary to the part that is to be moulded.

According to the present invention, said ejector 1 comprises an outer tube 11 which houses an inner cooling tube 12, which cools said figure insert 2.

Said outer tube 11 is made of a flexible material, for example, carbon fibre, carbon fibre mixed with fibreglass, or graphene, or any other suitable material.

Furthermore, said ejector 1 defines an upper segment 13 and a lower segment 14, the longitudinal axis of the upper segment 13 forming an acute angle (A) with the longitudinal axis of the lower segment 14, this angle being less than or equal to 6°.

As shown in FIG. 1, said lower segment 14 is placed substantially straight and said upper segment 13 is slightly inclined, up to a maximum of 6°, as indicated previously.

On one of the ends of the ejector 1 are joined, preferably by means of a high-resistance bicomponent glue, a connection bushing called a joining head 3, which carries two mechanised grooves, in order to house the O-ring seals 4, 5 therein, an upper one and a lower one, which will be necessary to meet two necessary requirements.

The upper seal 4 has the objective of ensuring the airtightness of the cooling of the figure insert 2, which each mould setter will manufacture, while the lower seal 5 will act to guarantee the airtightness of the device in the moulds incorporating the vacuum in the injection process.

This joining head 3 further incorporates a housing 6 for a quick-change system, in order to ensure the connection and position of each figure insert 2.

For the fastening of the device to the punch plate 8 of the mould in the corresponding position, a threaded bushing is used called a guide bushing 7, with the required demoulding inclination (maximum of 6° of inclination), the drilling of which in its entirety must cross through all the plate 8.

This bushing 7 will be the guide through which the outer tube 11 will slide in the demoulding movement thereof and will be positioned beneath the housing of the figure insert 2.

For the final assembly of the device in the mould, first, the outer tube 11 must slide through the guide bushing 7 inserted in the punch plate 8, with the insert 2 for the fastening thereof in the ejector plates 9, by means of a bushing duly housed between the same ejector plates 9 called the fastening base 10, by means of a tightening cone 14, and a tightening nut 15, fastening the device with precision.

Then, the outer tube 11 is cut, underneath the ejector plates 9, the final length of which has to allow us to couple a cooling source 16, provided with a cooling inlet 17 and a cooling outlet 18.

Since the thickness of the ejector plates 9 is variable, depending on the dimensions of the mould, each mould setter will determine the exact position for fastening the cooling source 16.

The cooling source 16 incorporates an airtight seal 19 on the inside thereof, which has the objective of preventing coolant leaks, as well as said inner tube 12 duly fastened thereto, which will need to be cut in the length thereof up to the insert 2.

Through this inner tube 12, the cooling liquid will enter in order to generate the cooling of the figure insert 2, and the evacuation of this cooling liquid will be performed through the space between the very outer tube 11 and the inner tube 12.

The cooling source 16, therefore, is fastened to the lower end of the outer tube 11, by means of a thread created for this purpose. As the cooling source 16 already incorporates an airtight seal 19, which enables the inlet and outlet directions to be positioned in the suitable direction for each need.

The total length, both that of the outer tube 11 and of the inner tube 12, will need to be cut, therefore, according to each application.

It should be taken into account that between the ejector plates and the base plate of the mould, enough space must be arranged in order to house all the tubes which will feed the cooling circuits, duly connected to the cooling source 16.

Despite having referred to a specific embodiment of the invention, it is evident for one skilled in the art that the device that has been described is susceptible to a number of variations and modifications, and that all the mentioned details can be replaced with other technically equivalent ones without departing from the scope of protection defined by the attached the claims.

The invention claimed is:

1. A device for demoulding negatives in thermoplastic injection moulds comprises an ejector provided on one of the ends thereof with a figure insert with a profile complementary to a part that is to be moulded,
characterised in that said ejector comprises an outer tube housing an inner cooling tube, which cools said figure insert, wherein said outer tube is made of a flexible material.

2. The device for demoulding negatives in thermoplastic injection moulds according to claim 1, wherein the outer tube is made of carbon fibre, carbon fibre mixed with fibreglass, or graphene.

3. The device for demoulding negatives in thermoplastic injection moulds according to claim 1, wherein said figure insert is joined to the ejector by means of a joining head.

4. The device for demoulding negatives in thermoplastic injection moulds according to claim 3, wherein the joining head comprises at least one airtight seal.

5. The device for demoulding negatives in thermoplastic injection moulds according to claim 1, wherein the inner cooling tube is made of stainless steel.

6. The device for demoulding negatives in thermoplastic injection moulds according to claim 1, wherein said ejector defines an upper segment and a lower segment, the longitudinal axis of the upper segment forming an acute angle (A) with the longitudinal axis of the lower segment.

7. The device for demoulding negatives in thermoplastic injection moulds according to claim 6, wherein said acute angle (A) formed by the longitudinal axis of the upper segment with the longitudinal axis of the lower segment is less than or equal to 6°.

8. The device for demoulding negatives in thermoplastic injection moulds according to claim 1, which also comprises a guide bushing (7) on the inside of which said ejector (1) moves.

9. The device for demoulding negatives in thermoplastic injection moulds according to claim 1, wherein the ejector is fastened to an ejector plate by means of a fastening base, a tightening cone and a tightening nut.

10. The device for demoulding negatives in thermoplastic injection moulds according to claim 1, wherein said ejector comprises on the far end thereof of the figure insert a cooling source provided with an inlet for cooling liquid and an outlet for cooling liquid, the inlet of the cooling liquid being produced through said inner tube and the outlet of the cooling liquid being produced through a space defined between the outer tube and the inner tube.

11. The device for demoulding negatives in thermoplastic injection moulds according to claim 1, wherein the outer tube is made of carbon fibre, carbon fibre mixed with fibreglass, or graphene.

* * * * *